Figure 1:
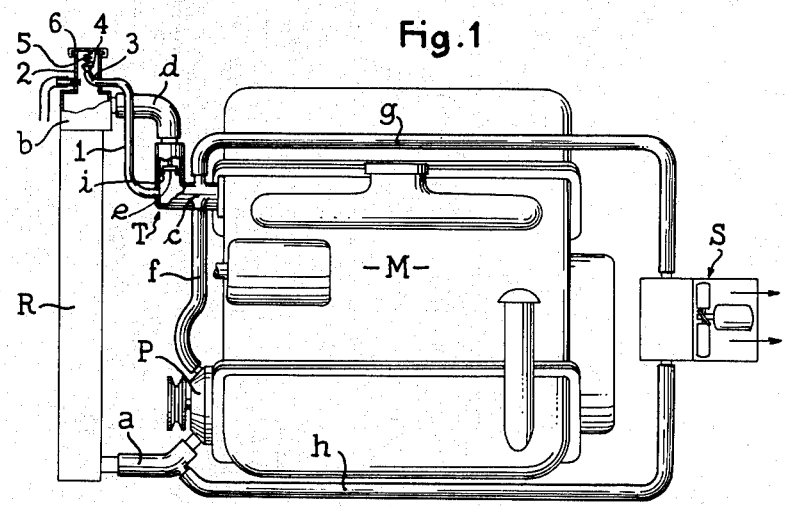

Dec. 7, 1965    M. DANGAUTHIER    3,221,720
SYSTEM FOR COOLING THE ENGINE OF A MOTOR VEHICLE
AND HEATING THE AIR OF THE VEHICLE
Filed Sept. 17, 1964

INVENTOR
MARCEL DANGAUTHIER
BY LeBlanc & Shur
ATTORNEYS

United States Patent Office

3,221,720
Patented Dec. 7, 1965

3,221,720
SYSTEM FOR COOLING THE ENGINE OF A MOTOR VEHICLE AND HEATING THE AIR OF THE VEHICLE
Marcel Dangauthier, Paris, France, assignor to La Publicite Francaise, Paris, France, a corporation of France
Filed Sept. 17, 1964, Ser. No. 397,093
Claims priority, application France, Nov. 13, 1963, 953,529
3 Claims. (Cl. 123—41.09)

The present invention relates to systems employing water for cooling internal combustion engines of motor vehicles and heating the air inside these vehicles in cold weather.

It is known that the water cooling circuits of motor vehicles at the present time usually comprise a thermostat device for bringing the engine more rapidly to a suitable temperature and more rapidly heating the interior of the vehicle in cold weather.

Said thermostat device comprises a valve placed in the conduit returning the water of the engine to the upper manifold of the water cooling radiator, this valve remaining closed until a minimum temperature of the water returning to the radiator, of the order of 70°–80° C., this closed valve thus permitting a circulation of the water in a closed circuit between the pump of the system and the water chambers of the engine without passing through the cooling radiator. When the minimum predetermined temperature is reached, the valve opens progressively so as to allow the cooling water to pass through the radiator.

The thermostats normally employed comprise in the valve an aperture which allows the air to escape when the cooling circuit is being filled with water, this water being poured into the radiator after radiator filler cap has been removed.

Further, the air of the vehicle is normally heated by a heating radiator which is supplied with hot water by the cooling circuit of the engine. Now, owing to the existence of the aforementioned aperture in the valve of the thermostat device, there occurs between the engine and the radiator—even when the valve is closed, that is, when the water has not reached the aforementioned minimum temperature—a parasitic circulation of water which slows down the rate at which the cooling water of the engine is heated. The luke-warm water passes through the aperture in the valve in the thermostat, returns to the radiator and is replaced by the cold water coming from the latter. Consequently the air inside the vehicle is heated at a slower rate.

The object of the present invention is to provide a system for cooling the water of the internal combustion engine of a motor vehicle and heating the air inside the vehicle, this system being so improved as to remedy completely the aforementioned drawback by extremely simple means, by a complete closing off of the communication between the engine and the upper part of the radiator so long as a minimum temperature has not been reached, the air being however allowed to escape when this system is being filled with water.

Said system, which is of the type including a cooling radiator and a thermostat device having a valve controlling the return of the hot water to the radiator, is so arranged that the valve of the thermostat device has no aperture and is adapted to prevent any passage of water through its valve seat when it is applied against the latter and the valve is by-passed by a conduit which is connected at one end to the conduit connecting the engine to the thermostat device and is open at its other end in the upper manifold of the radiator in such position that said open end is closed by the filler cap of the filler aperture of the radiator when the cap is in position to close said filler aperture.

Under these conditions, when the filler cap of the radiator is in position, that is, when the system is in condition to operate, the conduit by-passing the thermostat is closed at its end adjacent the radiator and cannot constitute a passage for the return of the water of the engine to the radiator, whereby, as the valve completely closes the passage through the thermostat device while the temperature of the water rises to the desired minimum value, no flow of water from the engine to the radiator is possible, the normal flow thereof occurring after the valve has been lifted off its seat.

When this system is being filled with water and the filler cap has been removed so that the corresponding end of the by-pass conduit is opened, the air and/or steam contained in the water chambers of the engine are free to escape.

In one embodiment of the invention, in which the radiator filler cap is of simple type providing a complete closure, this cap has connected to its inner face by elastically yieldable connecting means a valve which engages in the upper end of the by-pass conduit which forms a valve seat.

In another embodiment of the invention, the radiator cap is of the known pressure-suction type and the two usual valves of such a cap are completed by an additional valve which is mounted elastically on this cap and co-operates with the upper end of the by-pass conduit so as to close it when the filler cap is in position on the radiator.

Further features and advantages of the invention will be apparent from the ensuing description, with reference to the accompanying drawing to which the invention is in no way limited.

Figure 2:
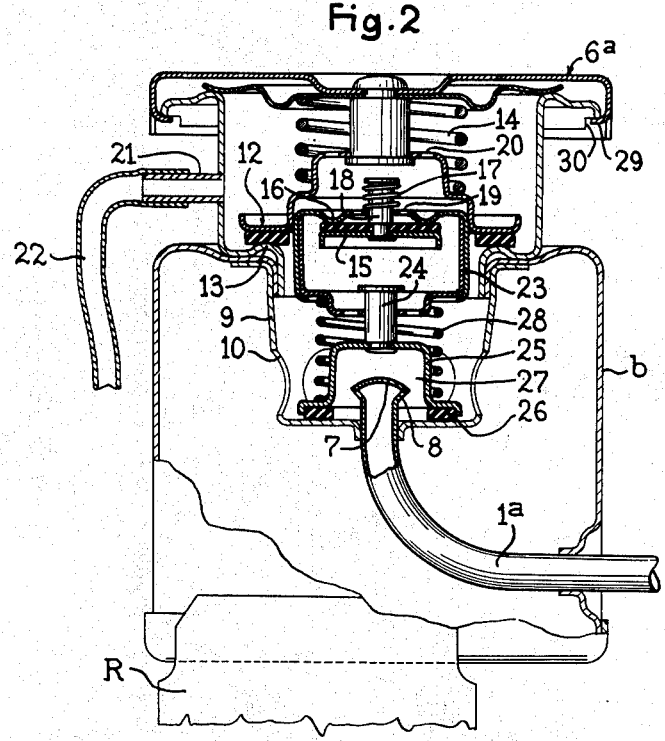

In the drawing:

FIG. 1 is a diagrammatic view of a system according to the invention in respect to a simple filler cap providing a complete closure of the filler aperture of the radiator, and FIG. 2 is a partial sectional view, on an enlarged scale, of the upper part of the radiator in the case of a pressure-suction type of filler cap.

In the embodiment shown in FIG. 1, the invention is applied to the cooling system of the heat engine M of a motor vehicle, this system also heating the air inside the vehicle by means of the water normally cooled by the radiator R.

The water is drawn in from the base of the radiator by way of a conduit $a$ and in normal operation the cooled water, after having passed through the water chambers of the engine M and the cylinder head thereof, returns to the manifold $b$ of the radiator R by way of a connection $c$, a thermostat device T and a conduit $d$. The thermostat device T comprises a valve $e$ which is adapted to stop the circulation so long as the temperature of the water in the engine M has not reached a given minimum valve, for example of the order of 70°–80° C.

Up to this temperature, the water circulates in the engine in a closed circuit since a conduit $f$ connects the upper outlet connection $c$ to the inlet of the pump P.

There is provided, in addition to the aforementioned circuits, an auxiliary circuit for heating the interior of the vehicle by means of a radiator S which is connected by conduits $g$ and $h$ to the upper outlet connection $c$ and to the inlet of the pump P respectively.

The above-described assembly is conventional and is completed in accordance with invention in the following manner.

The valve $e$ of the thermostat device T does not have an aperture and completely closes the communication $c$–$d$ when this valve is applied against its seat 4, that is, so long as the minimum temperature of 70°–80° C. has not been reached.

A by-pass conduit 1 by-passing the thermostat T connects the connection $c$ to the upper part of the manifold $b$ of the radiator R, or more precisely to the tubular filler spout 2 provided on this manifold for filling the radiator, this conduit 1 terminating in an upwardly-directed and open end portion 3. In normal operation, the open end 3 of the conduit 1 is closed by a valve 4 which is elastically connected by a spring 5 to the filler cap 6 closing the filler aperture 2 of the radiator.

As explained hereinbefore, according to this arrangement, in normal operation with the filler cap 6 in position on the filler aperture 2, the valve 4 is applied by the spring 5 against its valve seat formed in the open end 3 of the conduit 1 so that the latter is closed off and there is no communication between the water outlet connection $c$ and the upper manifold $b$ of the radiator R.

The water which is pumped by the pump P and flows to the water chambers of the engine and cylinder head cannot flow to the radiator. It therefore passes through the by-pass conduit $f$ and the air heating circuit $g$–S–$h$. Consequently, the temperature of the water rises rapidly.

As soon as the minimum temperature has been reached, the thermostat device T causes the valve $e$ to rise off its seat $i$ and the system operates normally and the water heated in the engine M is cooled in this system.

When water must be poured into the system, the filler cap 6 is removed in the normal manner together with the valve 4 attached thereto so that the end 3 of the conduit 1 is opened.

The air contained in the water chambers of the engine and cylinder head or any steam which might exist therein, can therefore freely escape to the atmosphere by way of the outlet connection $c$ and the conduit 1. It will be observed that a connection 21 is provided in the filler neck 2 for attaching the overflow pipe 22 and a rudimentary valve is provided in this connection. This valve, which does not have to provide a perfect seal, opens in the event of slight over pressures in the water circuit and allows entry of the exterior air in the event of a depression in the circuit.

FIG. 2 shows a preferred variant of the invention in which the air escape conduit $1^a$ terminates in a cap 7 provided with an air outlet aperture 8 within a fixed valve chamber 9. The latter is provided with openings 10 and is connected to the manifold $b$ of the radiator R and forms with an upper cylindrical portion 11 the radiator filler neck. The latter is closed by a filler cap $6^a$ of the pressure-suction type.

The filler cap $6^a$ comprises in the known manner a first pressure valve 12 which bears against a fixed seat 13 and opens upwardly when the pressure prevailing in the manifold $b$ exceeds atmospheric pressure, this valve 12 being applied against its seat by spring 14 and the connection to the atmosphere occurring by way of the connection 21 and the overflow pipe 22. The filler cap $6^a$ further comprises in the known manner a second suction valve 15 whose seat 16 is welded or soldered to the body of the valve 12. The valve 15 opens downwardy when there is a depression in the radiator and it is biased against its seat by a spring 17 disposed around the rivet 18 fixed to the suction vave which opens as soon as the pressure in the radiator drops below atmospheric pressure. The entry of air for eliminating the depression occurs by way of orifices 19 and 20 formed in the elements located above the suction valve and by way of the connection 21 and the overflow pipe 22.

According to the invention, the seat 16 of the valve 15 is constituted by a pressing which is secured to the valve body 12 and is formed over a perforated guide 23 in which is slidable a stud 24 carrying an auxiliary valve 25. This valve is bell-shaped and adapted to bear through the medium of a pad 26 against the flat bottom of the valve chamber 9 around the upper end of the by-pass conduit $1^a$ so as to close off the space 27 within said valve 25 and consequently the conduit $1^a$.

The valve 25 is biased against its seat by a spring 28 which closes off the chamber 27 and the conduit $1^a$ each time the filler cap $6^a$ is placed in position in the filler neck 11 in which it is held in position by any known means, such as by screwing or a bayonet coupling comprising the combination of tabs 29 and recesses 30.

It will be understood that when the filler cap is removed for the purpose of filling the radiator R with water, the three valves, namely the pressure valve 12, the suction valve 14 and the auxiliary valve 25 are removed therewith so that the by-pass conduit $1^a$ communicates directly with the interior of the valve chamber 29 and consequently with the atmosphere.

The operation as concerns the function of the conduit $1^a$ is identical to that of the first embodiment described hereinbefore.

Although specific embodiments of the invention have been described, many modifications and changes may be made therein without departing from the scope of the invention as defined in the appended claims.

Having now described my invention what I claim as new and desire to secure by Letters Patent is:

1. A system for cooling the heat engine of a motor vehicle and heating the air inside the vehicle, said system comprising a cooling radiator having a filler aperture and filler cap for closing the filler aperture, a cooling water circuit connecting the radiator to the engine, a thermostatically controlled valve inserted in the part of the circuit returning water from the engine to the radiator, said valve having no aperture therein and preventing any flow of water from the engine to the radiator when the valve is applied against the seat therefor, a by-pass conduit by-passing the valve and having one end connected to the part of the circuit connecting the engine to the valve and the other end open and located in the upper manifold of the radiator in such position that the open end is closed by the filler cap when the latter is in its operative position for closing the filler aperture.

2. A system for cooling the heat engine of a motor vehicle and heating the air inside the vehicle, said system comprising a cooling radiator having a filler aperture and filler cap for closing the filler aperture, a cooling water circuit connecting the radiator to the engine, a thermostatically controlled valve inserted in the part of the circuit returning water for the engine to the radiator, said valve having no aperture therein and preventing any flow of water from the engine to the radiator when the valve is applied against the seat therefor, a by-pass conduit by-passing the valve and having one end connected to the part of the circuit connecting the engine to the valve and the other end open and located in the upper manifold of the radiator, a second valve secured to the filler cap by elastically yieldable means and engageable in the open end of the by-pass conduit which constitutes a valve seat when the filler cap is in position for closing the filler aperture, the filler cap being of the type affording a complete closure of the filler aperture.

3. A system for cooling the heat engine of a motor vehicle and heating the air inside the vehicle, said system comprising a cooling radiator having a filler aperture and filler cap for closing the filler aperture, a cooling water circuit connecting the radiator to the engine, a thermostatically controlled valve inserted in the part of the circuit returning water from the engine to the radiator, said valve having no aperture therein and preventing any flow of water from the engine to the radiator when the valve is applied against the seat therefor, a by-pass conduit by-passing the valve and having one end connected to the part of the circuit connecting the engine to the valve and the other end open and located in the upper manifold of the radiator, the filler cap being of the known pressure-suction type having two valves, the latter being completed by an additional valve which is elastically mounted on the cap and is engageable with the upper open end of the by-pass conduit so as to close the open end when the filler cap is in position for closing the filler aperture.

References Cited by the Examiner

FOREIGN PATENTS 943,918  5/1956  Germany.

KARL J. ALBRECHT, *Primary Examiner.*